United States Patent [19]
Hanson et al.

[11] 3,959,894
[45] June 1, 1976

[54] PERCEPTUAL CELLS WRITING GUIDE

[76] Inventors: Christina D. Hanson, 809 Vauclain Road, Bryn Mawr, Pa. 19010; Gail E. Duchmann, 541 Calhoun St., New Orleans, La. 70118

[22] Filed: Dec. 30, 1974

[21] Appl. No.: 537,210

[52] U.S. Cl. .................................................. 35/38
[51] Int. Cl.² ........................................ G09B 21/02
[58] Field of Search ............... 35/36, 37, 38, 35 A, 35/35 H; 101/3 R; 281/45

[56] References Cited
UNITED STATES PATENTS

| | | | |
|---|---|---|---|
| 910,330 | 1/1909 | Wait | 35/38 X |
| 1,372,360 | 3/1921 | McNeill | 35/38 |
| 1,426,055 | 8/1922 | Fast | 35/38 |
| 1,716,036 | 6/1929 | Dunning Jr. | 35/37 |
| 1,870,145 | 8/1932 | Sharp | 35/38 |
| 1,920,704 | 8/1933 | Lorber | 35/37 |
| 2,530,437 | 11/1950 | Marks | 35/38 |
| 2,913,836 | 11/1959 | Strunk | 35/38 |
| 3,370,530 | 2/1968 | Henderson | 35/38 X |
| 3,520,072 | 7/1970 | Greenwood | 35/35 H |
| 3,579,867 | 5/1971 | Kuhn | 35/38 |
| 3,802,107 | 4/1974 | Kemp | 35/37 |

*Primary Examiner*—Wm. H. Grieb

[57] ABSTRACT

A perceptual cells guide is provided for persons requiring manual assistance in forming messages upon paper sheets or the like. A substantially rigid guide sheet is secured in position adjacent the face of the paper, and this guide sheet is composed of a plurality of parallel, intersecting horizontal and vertical strips of substantially rigid material, forming a plurality of regularly arranged perceptual cells which extend across and up and down the sheet of paper.

The cells are preferably rectangular and are aligned with one another vertically and horizontally. Each cell has a pair of spaced apart horizontal guide edges and a pair of spaced apart vertical guide edges, all forming guides for persons of limited sight or who otherwise require assistance in forming orderly messages on the paper.

12 Claims, 6 Drawing Figures

PERCEPTUAL CELLS WRITING GUIDE

BRIEF SUMMARY OF THE INVENTION

This invention is directed to a guide for persons of limited vision, or those otherwise requiring manual assistance in forming orderly messages upon paper or the like. In a preferred form, this invention relates to a novel writing guide for the blind, allowing blind persons to write messages with pencil and paper, which messages can easily be read and understood by sighted persons.

This invention further relates to a device which can be used effectively for persons having learning disabilities or motor control difficulties, in addition to the visually handicapped, and which serves as an aid which can be readily used and rapidly converted into a useful tool for writing messages that are easily read and understood by persons who are able to read inscriptions written upon paper with pencil, or with pen and ink, for example.

DESCRIPTION OF THE PRIOR ART

Writing guides have heretofore been designed for the blind, including the provision of a paper holder and a slotted body disposed at one side of the holder, together with a stencil plate positioned over the sheet of paper in the holder, in order to guide the writer horizontally. One such device is shown in the patent to Sharp, U.S. Pat. No. 1,870,145 granted Aug. 2, 1932, and this structure prevents the writer from writing "uphill" or "downhill" in the sense that the horizontal guides restrict the movement of the hand in a vertical sense to a confined area, during the writing process. Other similar patents, which restrict the writer at the top and bottom but not to the left side or to the right side, include the patent to Marks, U.S. Pat. No. 2,530,437 and the patent to Strunk, U.S. Pat. No. 2,913,836. The patent to McNeill, U.S. Pat. No. 1,372,360 also discloses a writing pad for the blind. This operates only one line at a time, and after completing each line, the writer must depress a thumb piece in order to proceed downwardly to the next line. Other patents, such as Fast, U.S. Pat. No. 1,426,055 and Kuhn, U.S. Pat. No. 3,579,867 have been provided, but although these provide guides which define horizontal lines along which a blind writer is guided, they leave considerable degrees of freedom and latitude in other directions and therefore allow considerable margin for deviation and error as the writing proceeds.

It is of course old in the art, as shown by the patents to Dunning, U.S. Pat. No. 1,716,036 and Lorber U.S. Pat. No. 1,920,704 to provide stencils which are useful for sighted persons having good hand dexterity, but ordinary stencils are of course quite useless in conjunction with persons who are blind or who have limited visual acuity, or whose hand movements are impaired.

It is accordingly an object of this invention to provide a new device which aids persons of limited sight or those with learning disabilities or motor control difficulties, which for the first time puts them in the position of being able to communicate readily and conveniently in writing with persons who are able to read. Still another object of this invention is to provide such a device, the use of which can be learned quickly and easily, and which almost immediately becomes a useful tool for written communication. Other objects and advantages of this invention, including the simplicity and economy of the same, and the ease with which it may be adapted to a wide variety of shapes and forms, will further become apparent hereinafter, and in the drawings.

DRAWINGS

DETAILED DESCRIPTION OF PREFERRED EMBODIMENTS OF THE INVENTION

Figure 2:
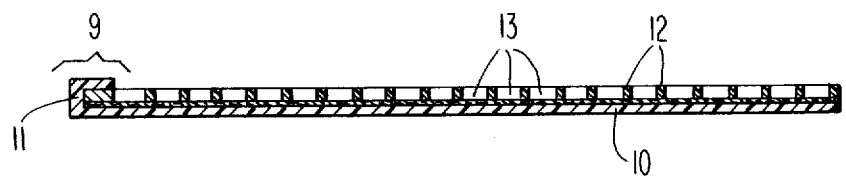
FIG. 2 is a sectional view of the perceptual cells device appearing in FIG. 1, taken as indicated by the lines and arrows II — II which appear in FIG. 1.

Although in the following description specific terms will be used for the sake of clarity and understandability, it will be appreciated that these terms have been used only as descriptions of the particular forms of the invention that have been selected for illustration in the drawings, and are not intended to limit the scope of the invention, which is defined in the appended claims.

Figure 1:
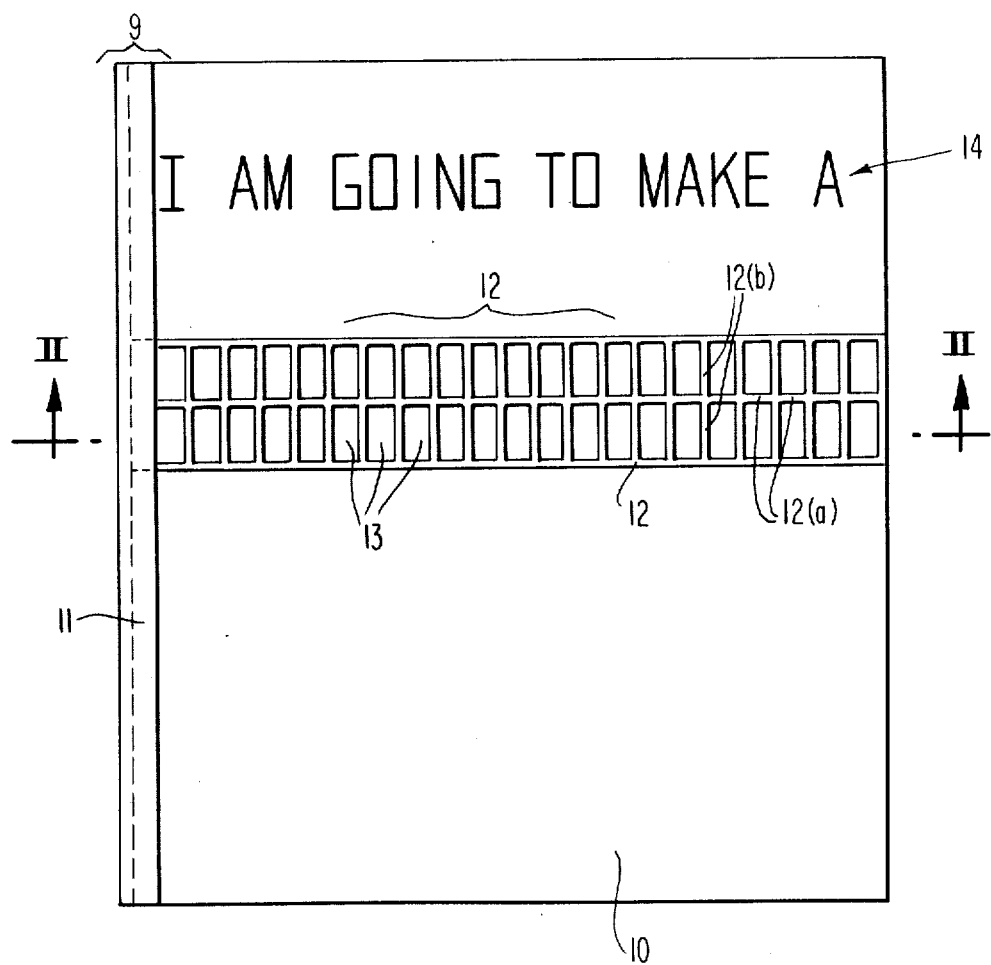
FIG. 1 is a face view of one form of a perceptual cells writing guide embodying features of this invention, shown in conjunction with a sheet of paper upon which a series of words have been inscribed.

Turning now to the perceptual cells writing guide shown in FIGS. 1 and 2, the number 10 designates a piece of paper supported on a rigid backing 11, having a trackway 9 which extends up and down along one side of the backing sheet 11. The number 12 designates a relatively thick strip (one that is considerably thicker than a normal piece of paper, or at least about one-sixteenth of an inch thick, for example). This thick strip 12 is slidable up and down along the trackway 9, beneath the overhanging edge of the trackway 9, and thus is slidable up and down the sheet of paper, with its edge confined within the trackway.

In accordance with this invention, the strip 12 has a plurality of elongated cut-outs for "perceptual cells" 13. Each perceptual cell 13 is formed in the guide sheet, which includes a plurality of substantially equally spaced and intersecting horizontal strips 12a and vertical strips 12b of substantially rigid material, arranged to form a plurality of regularly arranged perceptual cells extending across and up and down the sheet. These cells 13 are aligned with one another vertically and horizontally, and each cell has a pair of spaced apart horizontal guide edges and a pair of spaced apart vertical guide edges, as will be apparent in FIG. 1. Accordingly, it will be apparent that a blind person may use an ordinary pen or pencil, and may write in the rectangles formed by the perceptual cells 13, preferably applying one letter in each one of the cells. Since each cell forms a new guide for each new letter, the result inscribed by a person of limited sight or one who is blind, or seriously afflicted with learning disability or with motor control difficulties, has an appearance of the general type indicated by the number 14 in the upper portion of FIG. 1.

It will be apparent from FIG. 1 that the writer, after completing a given line of letters or words, may proceed immediately to the next line beneath, and that at any desired time the entire sheet of perceptual cells may be slid downwardly or upwardly by the writer, with the right hand edge of the sheet travelling within the track 9.

Figure 3:
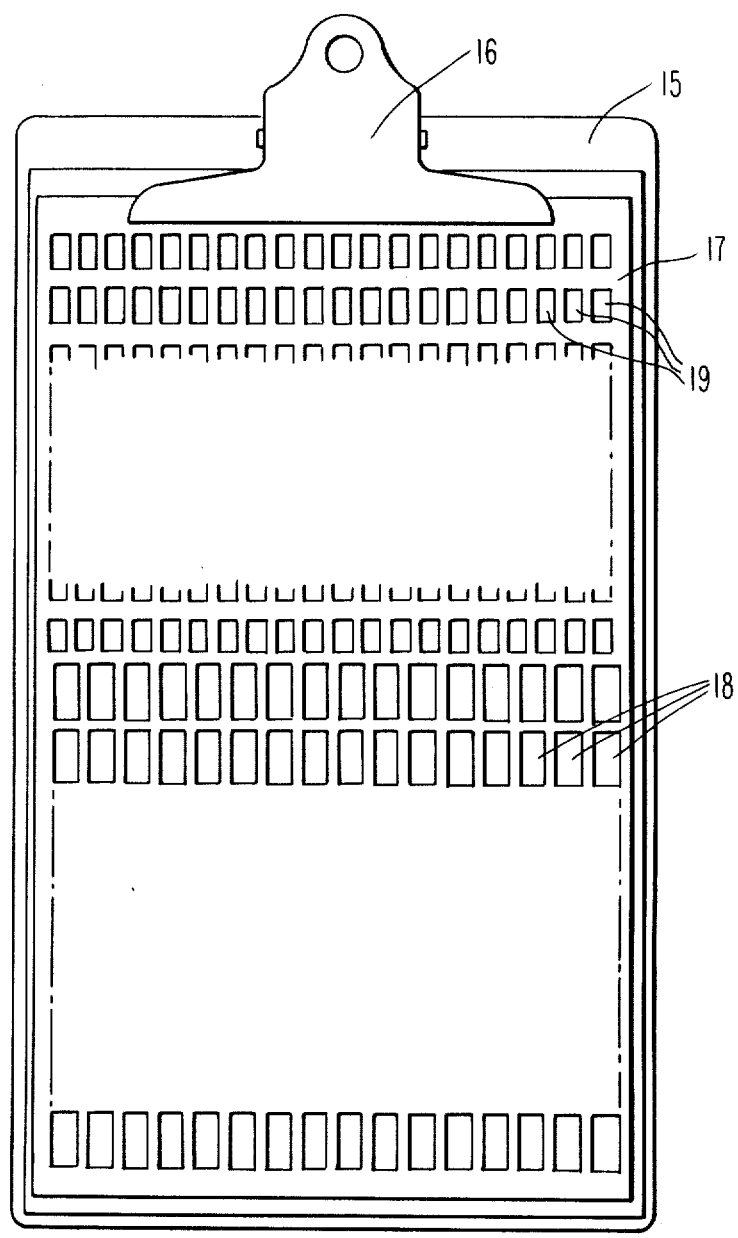
FIG. 3 is a face view of a modified form of the perceptual cells writing guide in accordance with this invention.

The form of the invention shown in FIG. 3 shows a special form of the device not having a trackway, but having a common clipboard 15 with a clip 16, and a large metal or plastic plate 17 having a plurality of large perceptual cells 18 arranged as a group covering one-half of the plate 17, and a plurality of relatively small perceptual cells 19 arranged as a group covering the other half. Such a form of the invention is useful for teaching, allowing a beginner to start with the group of large cells 18 and to progress to the group of small cells 19.

Figure 4:
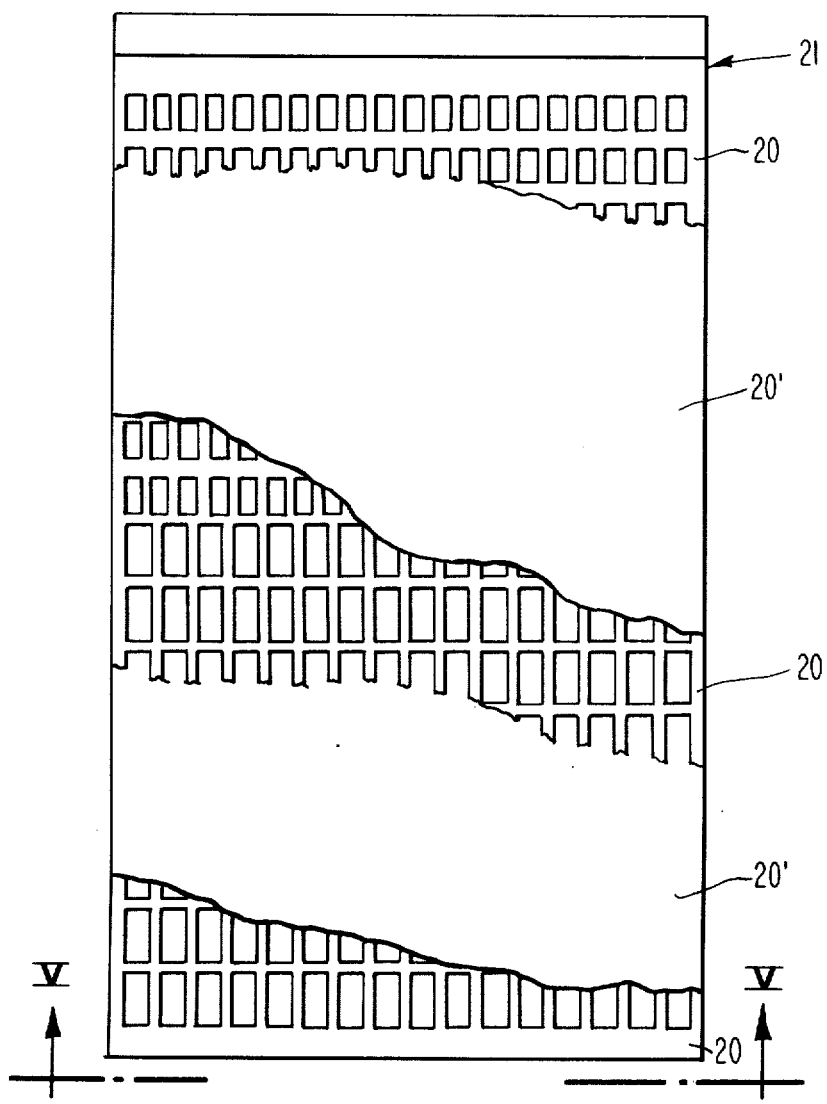
FIG. 4 is a face view of a writing pad which includes a multiplicity of perceptual cell writing guides in accordance with this invention, comprising a further modification.
Figure 5:
FIG. 5 is a sectional view taken as indicated by the lines and arrows V — V which appear in FIG. 4.

FIGS. 4 and 5 show a tablet 21 having a plurality of spaced apart plates 20, each with a plurality of pieces of paper 20' in between them. In accordance with this form of the invention, the entire tablet may be prepared in a unitary form, just like an ordinary pad of legal paper, and can be perforated along the top at 21. It is highly useful in accordance with this invention to provide a plurality of perceptual cells plates 20, so that even after a considerable number of pieces of paper have been used and torn out of the tablet, there will not be an excessive amount of space between the paper upon which the user is writing, and the nearest perceptual cells plate 20. In other words, after a certain number of sheets of paper have been used, the writer may simply tear off the perceptual cells plate 20 associated with those pieces of paper, and may progress down to the next perceptual cells plate 20 within the tablet.

Figure 6:
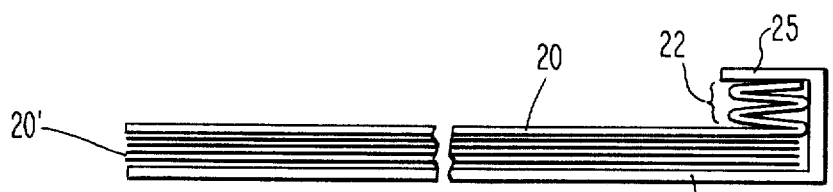
FIG. 6 is a sectional view similar to FIG. 5 but showing a still further modification.

FIG. 6 shows still another form of apparatus in accordance with this invention. In this form, a single perceptual cells plate 20 is provided in a tablet having a back 24, a top binder 25, and a perceptual cells plate 20 which is maintained within the binder 25 by an accordion folded structure 22. Thus, as the writer uses successive pieces of paper 20' and tears them out of the tablet, the accordion structure 22 readily permits the perceptual cells plate 20 to sink to the new level formed at the uppermost usable sheet of paper 20' remaining in the tablet. In this manner, all of the sheets of the tablet may be used, with the use of only a single perceptual cells plate 20.

It will be appreciated that the perceptual cells sheets in accordance with this invention may be composed of only a limited number of rows, as shown in FIG. 1, or with large numbers of rows, desirably covering the entire sheet of paper intended to be used by the writer.

It is important in accordance with this invention to provide a plurality of rectangular perceptual cells, arranged in an orderly manner, in vertical rows and in horizontal rows. They may all be the same size or may be provided in different sizes on the same plate. The plates or sheets themselves may be formed of metal or plastic, and should be at least three times the thickness of the paper upon which the letters are being written. Each perceptual cell should be bounded by a straight line of sufficient thickness to keep the writer's pencil within the bounds of the area defined by the perceptual cell.

Although the perceptual cells sheets in accordance with this invention have been shown in conjunction with slide tracks and in other constructions, it will be appreciated that they may be used in a wide variety of forms, including insertion into a three ring notebook. It is highly desirable, however, to provide a means of one kind or another to maintain the perceptual cells sheet in contact with or immediately adjacent to the paper being written upon.

Regardless of the particular form of the invention that is used, it is considered to be a substantial step forward since it offers a blind person, or a person having learning disability or motor control difficulty, a definite way to communicate with persons who cannot read braille but who are capable of reading ordinary printed lettering. Also, perceptual cells in accordance with this invention are particularly appropriate for the use of the tactile senses which are highly developed in a blind person, and are responsible for the production of a clearly legible, ordered way of writing.

Many studies have indicated that it is highly desirable to provide a perceptual cells sheet or plate in accordance with this invention of rigid plastic or metal, having perceptual cells which are higher than they are wide. In a particularly preferred embodiment, the cells may be six-sixteenth of an inch wide and fourteen-sixteenth of an inch high; the ratio of height to width should be about 3:1 to 1.5:1.

The operation of the perceptual cells guide in accordance with this invention will now become clearly apparent. In order to function successfully, the writer should have some knowledge of the alphabet and of written alphabet forms, should know now to hold and operate a pencil, should be able to comprehend directions, and should have some tactile and memory ability.

The use of the perceptual cells by the beginner is greatly influenced by a combination of tactile and auditory stimuli, with the result that a totally blind person responds rapidly and easily, particularly when he is informed continuously about the state of his progress. As is apparent from FIG. 1, spaces are created between words by simply skipping the appropriate cells and proceeding to the next. At the end of each line, the writer simply traces with his fingers the location of the next lower row, and follows it to its left extremity, resuming writing within the first perceptual cell at that location.

Perceptual cells devices, and pads and tablets incorporating them, can be readily mass produced and can be widely purchased and used at minimum expense. Tablets of the type shown in FIG. 5 may use polyethylene or other thick, substantially rigid sheet materials for the formation of the perceptual cells in accordance with this invention.

It will be apparent that a wide variety of changes may be made in the form of the perceptual cells device without departing from the spirit and scope of this invention. Changes may be made with respect to the sizes of the cells, the material of which the perceptual cells sheet is formed, and the manner in which the sheet is maintained in position with respect to the paper being written upon. It will be appreciated accordingly that equivalent elements may be substituted for those specifically shown and described, that certain parts may be used independently of others, and that various other changes may be made without departing from the spirit and scope of the invention as defined in the appended claims.

The following is claimed:

1. A perceptual cells guide for persons requiring manual assistance in forming messages upon paper or the like, comprising:
   a. support means arranged to hold the paper in a substantially flat plane,
   b. retaining means connected to said support means, and
   c. a substantially rigid guide sheet retained by said retaining means adjacent the face of said paper, said guide sheet having a thickness greater than said paper and including a plurality of substantially equally spaced and intersecting horizontal and vertical strips of substantially rigid material arranged to form a plurality of regularly and symmetrically arranged perceptual cells arranged in a group, which cells are substantially identical to each other in height, width and shape throughout the group, all of said cells being substantially rectangular in shape, extending across and up and down said sheet, said cells being aligned with one another vertically and horizontally, and each said cell having a pair of spaced apart horizontal guide edges and a pair of spaced apart vertical guide edges, whereby a writing instrument may be inserted into said cells successively, and whereby written indicia may be applied to said paper in such a manner that guidance is provided for the writer by the thicknesses of the inner edges of both said horizontal and said vertical strips.

2. The perceptual cells guide defined in claim 1, wherein said retaining means is a trackway connected to said support means.

3. The perceptual cells guide defined in claim 1, wherein said rigid guide sheet extends vertically substantially the height of the paper being written upon.

4. The perceptual cells guide defined in claim 1, wherein said guide sheet extends vertically over only a portion of the paper being written upon.

5. The perceptual cells guide defined in claim 1, wherein all of said perceptual cells are of the same shape and size.

6. The perceptual cells guide defined in claim 1, wherein a plurality of groups are provided, and wherein the perceptual cells of one group are larger than the perceptual cells of another group.

7. The perceptual cells guide defined in claim 1, wherein said perceptual cells are higher than they are wide.

8. The perceptual cells guide defined in claim 1, wherein said support means is the back of a tablet, and wherein a plurality of sheets of paper are maintained in said tablet.

9. The perceptual cells guide defined in claim 1, wherein a plurality of sheets of paper are provided in conjunction with a plurality of intervening perceptual cells rigid guide sheets.

10. The perceptual cells guide defined in claim 1, whrein said guide sheet is at least about one-sixteenth of an inch thick.

11. The perceptual cells guide defined in claim 1, wherein said cells have a ratio of height to width of about 3:1 to 1.5:1.

12. A perceptual cells guide for persons requiring manual assistance in forming messages upon paper or the like, comprising:
   a. support means arranged to hold the paper in a substantially flat plane,
   b. retaining means connected to said support means, and
   c. a substantially rigid guide sheet retained by said retaining means adjacent the face of said paper, said guide sheet including a plurality of substantially equally spaced and intersecting horizontal and vertical strips of substantially rigid material arranged to form a plurality of regularly arranged perceptual cells extending across and up and down said sheet, said cells being aligned with one another vertically and horizontally, and each said cell having a pair of spaced apart horizontal guide edges and a pair of spaced apart vertical guide edges, wherein a plurality of sheets of paper are provided adjacent to said support means, and wherein said retaining means includes an accordion connection between said retaining means and said substantially rigid guide sheet.

* * * * *